3,699,068
EMULSION POLYMERISATION OF
VINYL CHLORIDE
John Anthony Flint and Graham John Blake, Runcorn,
England, assignors to Imperial Chemical Industries
Limited, London, England
No Drawing. Filed Apr. 17, 1970, Ser. No. 29,693
Claims priority, application Great Britain, Apr. 23, 1969,
20,804/69
Int. Cl. C08f 3/30
U.S. Cl. 260—29.6 MQ                                13 Claims

ABSTRACT OF THE DISCLOSURE

A process for the production of a stable aqueous vinyl chloride polymer emulsion suitable for conversion to fibers in which the polymerization is effected at a temperature below 0° C. in an aqueous medium, optionally containing at least one antifreeze, in the presence of an emulsifying agent comprising at least one soluble salt, for example an alkali metal or ammonium salt, of a sulfonic acid derivative of an alkyl phenoxy polyether alcohol, said derivative having the formula:

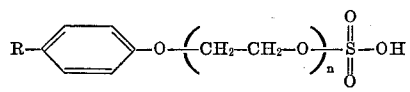

where R is an alkyl group of from 5 to 20 carbon atoms and $n$ is a whole number of from 2 to 12.

---

This invention relates to the emulsion polymerisation of vinyl chloride and in particular to the preparation of vinyl chloride polymer emulsions which are suitable for conversion to fibers.

It is known that vinyl chloride may be polymerised in emulsion in an aqueous medium by means of suitable catalysts; for example, redox catalysts, e.g. ferrous sulfate/ammonium persulfate, and free radical catalysts, e.g. peroxides. The presence of an emulsifying agent is generally necessary in order to maintain both the vinyl chloride monomer and the vinyl chloride polymer which is produced therefrom in the form of an emulsion during and after polymerisation. Many emulsifying agents are described in the literature. They may be of the cationic or non-ionic type, or they may be anionic, e.g. sodium salts of mono alkyl sulfates and of alkyl sulfonates, and esters of sodium sulfosuccinic acid.

It is also known that emulsion polymerisation of vinyl chloride at low temperatures, for example below 0° C., favours the production of a polymer which is less branched than that produced at higher temperatures, which contains a greater proportion of syndiotactic crystalline polymer and which is particularly suitable for conversion to fibers. A vinyl chloride polymer emulsion prepared under these low temperature conditions and which is to be used directly for conversion to fibers should have as high a solids content of vinyl chloride polymer as possible, should be sufficiently stable to be stored, at least for a short time after completion of polymerisation, and also should be sufficiently finely dispersed to be spun satisfactorily through a fine orifice. We have found that many of the emulsifying agents conventionally used in normal emulsion polymerisation processes operated at temperatures of from e.g. 50° C. to 60° C., e.g. sodium lauryl sulfate, sodium stearate and sodium palmitate, tend to be insufficiently soluble in the polymerisation medium at temperatures below 0° C. to produce the required emulsifying effect. Also, it is often found that even when the emulsifying agent is sufficiently soluble in the polymerisation medium at these low temperatures an emulsion of high solids content is generally either so unstable that it is unsuitable for conversion to fibers, or partially coagulates or precipitates even before polymerisation is completed. Where a relatively stable emulsion is produced it is generally found to have a solids content which is too low for easy conversion to fibers.

We have now found a class of emulsifying agents which enables the emulsion polymerisation of vinyl chloride at temperatures below 0° C. to be effected to yield polymer emulsions of high solids content and improved stability which are suitable for conversion to fibers.

According to the present invention we provide a process for the production of a stable aqueous vinyl chloride polymer emulsion suitable for conversion to fibers, in which the polymerisation is effected at a temperature below 0° C. in an aqueous medium in the presence of an emulsifying agent comprising at least one soluble salt of a sulfonic acid derivative of an alkyl phenoxy polyether alcohol, said derivative having the formula

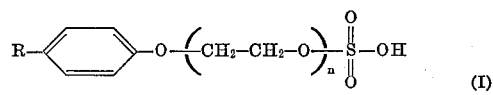

where R is an alkyl group of from 5 to 20 carbon atoms and $n$ is a whole number from 2 to 12.

The aqueous vinyl chloride polymer emulsions produced by the process of our invention are generally fluid, mobile materials, having a milk-like appearance, in which there is no coagulation of the vinyl chloride polymer into discrete particles which are visible to the naked eye.

According to a further embodiment of the invention we provide an emulsion of vinyl chloride polymer in an aqueous medium containing an emulsifying agent wherein the emulsifying agent comprises at least one soluble salt of a sulfonic acid derivative of an alkyl phenoxy polyether alcohol, said derivative having the Formula I above, where R is an alkyl group of from 5 to 20 carbon atoms and $n$ is a whole number from 2 to 12.

The aqueous emulsions of vinyl chloride polymer produced by the process of our invention are suitable for conversion to fibers by known methods, for example, by dissolving in the emulsion a fiber-forming polymeric material, referred to as the matrix, and spinning the mixture through at least one orifice into a medium, referred to as the coagulant, in which the matrix is precipitated into a fibrous structure in which particles of vinyl chloride polymer are embedded. The thus formed spun structure may be improved in strength by fusing together, or coalescing the particles of vinyl chloride polymer.

The term vinyl chloride polymer as used throughout this specification includes both homopolymers of vinyl chloride and copolymers of vinyl chloride with other monomers copolymerisable therewith, for example, up to 30 mole percent of such copolymerisable monomers.

By soluble salt we means a salt which will dissolve to form at least a 1% solution by weight in the aqueous medium in which the vinyl chloride is polymerised.

Suitable salts of the sulfonic acid derivative of an alkyl phenoxy polyether alcohol hereinafter referred to as the sulfonic acid derivative, include, for example, alkali metal salts, e.g. the sodium salt. If desired, the ammonium salt of the sulfonic acid derivative may be used.

It is preferred that the alkyl group R is the structure shown in Formula I be a nonyl group on account of the availability of this derivative, although it is to be understood that other alkyl groups having from 5 to 20 carbon atoms may be used, if desired.

The process of our invention may be effected in the presence of a mixture of salts of the sulfonic acid derivatives of Formula I. Thus, although each salt will comprise a salt of a derivative of Formula I in which $n$ is a whole number, the mixture may be such that the average value of $n$ in the mixture is a number other than a whole number.

On account of the greater efficiency of the emulsifying agent in producing a stable emulsion of vinyl chloride polymer having a high solids content the value of $n$ in the salt of the sulfonic acid derivative of Formula I is preferably in the range 2 to 9. Particular salts of a sulfonic acid derivative of Formula I which may be mentioned include, for example, sodium salts of a sulfonic acid of Formula I in which R is a nonyl group and in which $n$ is 4, 5 or 9, the ammonium salt in which R is a nonyl group and in which $n$ is 4, and a mixture of ammonium salts in which R is a nonyl group and in which $n$ has an average value of 5.5.

The aqueous medium in which the polymerisation is effected may be water. However, as the polymerisation is effected at a temperature below 0° C., and generally at a temperature between 0° C. and —40° C., for example, at a temperature of about —20° C., it may be necessary for the aqueous medium to comprise a mixture of water and a suitable amount of at least one compound (hereinafter referred to as antifreeze) which is miscible with water and which will depress the freezing point of water so as to maintain the polymerisation medium liquid at the polymerisation temperature. Suitable aqueous media include mixtures of water and an antifreeze of ethylene glycol and methanol, and mixtures of water and an antifreeze of ethylene glycol. It is usual to effect the polymerisation at a temperature of between —10° C. and —30° C., e.g. about —20° C., in a medium of water and ethylene glycol in about equal proportions by weight. Suitable proportions of antifreeze and water may be determined by means of simple experiment and by reference to the examples at the end of this specification.

The concentration of the emulsifying agent to be used in the polymerisation will depend on the desired solids content of polymer in the emulsion, on the degree of stability of the emulsion which is required, on the nature of the salt and of the value of $n$ in the sulfonic acid derivative of Formula I, and on the nature of the antifreeze, if any, in the aqueous medium.

It is economically desirable to use the lowest concentration of emulsifying agent consistent with achieving the desired solids content and stability of the emulsion. Thus, for example, where the vinyl chloride polymer in the emulsion is to be converted to fibers it is generally sufficient to use an amount of emulsifying agent which will ensure that the emulsion remains stable, that is visibly uncoagulated to the naked eye, during the period between completion of the polymerisation and the spinning of the emulsion. This period may be very short, for example, a few hours or at most a few days.

A greater concentration of emulsifying agent will be necessary the higher the solids content of the emulsion and the greater the degree of stability required and it is to be understood that for a particular concentration of emulsifying agent the polymerisation should not be effected for a sufficiently long period of time that the resulting emulsion is unstable and coagulates into discrete particles visible to the naked eye.

In general, and particularly where the aqueous medium comprises a mixture of water and ethylene glycol, we find that from 0.5% to 8% of the emulsifying agent by weight of vinyl chloride to be polymerised will suffice. Preferred concentrations of emulsifying agent are 1% to 6%, more preferably 4% to 6%, by weight of vinyl chloride to be polymerised. The particular concentration of emulsifying agent chosen should be such as to give an emulsion having the desired stability and solids content of polymer. We find it is possible to produce emulsion having a solids content of polymer up to 40% by weight or greater.

Where the aqueous medium comprises a mixture of water and an antifreeze of ethylene glycol and methanol we find the methanol may have some adverse effect on the stability of the emulsion compared with the case where the aqueous medium comprises water and an antifreeze of ethylene glycol. Thus, for example, where vinyl chloride is polymerised in the presence of approximately 5% by weight of the ammonium salt of a sulfonic acid derivative of Formula I in which R is a nonyl group and $n$ is 4 it is preferred that, where the aqueous medium comprises 60% by volume of water, the medium should preferably contain no more than 10% to 15% by volume of methanol, the remainder being ethylene glycol, if a stable, high solids content emulsion is desired. Where the aqueous medium comprises 65% by volume water it is preferred that the medium contain no more than about 20% to 25% by volume of methanol, the remainder being ethylene glycol, if a high solids content emulsion is desired. Suitable concentrations of emulsifying agent to be used by weight of the vinyl chloride to be polymerised may be determined by means of simple experiment and by reference to the examples set out at the end of this specification.

The concentration of vinyl chloride in the aqueous medium may vary within wide limits; we find it suitable to use one part of vinyl chloride for every 0.5 to 5 parts by weight of the aqueous medium. The catalysts used must be active at the low temperature and must be soluble in the aqueous medium. Examples of suitable catalysts are the combination of ammonium persulfate and ferrous sulfate, and the combination of ammonium persulfate, ferrous sulfate and ascorbic acid. The polymerisation may be effected in the absence of oxygen, e.g. in an atmosphere of an inert gas, e.g. nitrogen. Chain transfer agents, e.g. carbon tetrachloride, bromotrichloromethane, lauryl mercaptan and tetrahydrofuran may be used, if desired, to regulate the molecular weight of the vinyl chloride polymer. If desired, suitable polymer additives, e.g. antioxidants and ultra-violet stabilisers, may be added to the polymerisation medium before or after polymerisation.

We have also found that the stability of the emulsion of vinyl chloride polymer may be further increased by reducing the concentration of the antifreeze in the aqueous medium after the polymerisation is completed. For example, where polymerisation has been effected in an aqueous medium of water and ethylene glycol, reduction of the concentration of ethylene glycol in the medium after polymerisation has been completed may markedly increase the stability of the emulsion of vinyl chloride polymer. It may also be of advantage to reduce the concentration of antifreeze in the aqueous medium of the emulsion prior to addition to the emulsion of the fiber forming polymeric matrix used in the production of fibers by the method described previously. If the concentration of antifreeze is not as reduced undesirable coagulation of the vinyl chloride polymer particles in the emulsion may result depending of course, on the nature of the matrix, rendering the emulsion unsuitable for use in fiber spinning.

This reduction may conveniently be effected by dialysis. Where it is desired to reduce the concentration of ethylene glycol in an emulsion of vinyl chloride polymer in a medium of water and ethylene glycol the dialysis membrane may be regenerated cellulose film. We have found it to be particularly convenient to effect the separation by placing the vinyl chloride polymer emulsion in a container formed of regenerated cellulose. If excessive dilution of the emulsion due to diffusion of water into the container is to be avoided it is preferred to use a sealed container. Where a sealed container is used, it may be immersed in water, if desired. It is preferred to use distilled water. Dialysis may also remove some of the emulsifying agent from the emulsion and it may be desirable to replace some at least of the lost emulsifying agent after dialysis. Suitably, the concentration of antifreeze in the emulsion may be reduced to a concentration of less than 15% and preferably less than 5% by weight of the total weight of the emulsion.

The invention is now illustrated by the following examples in which all parts are expressed as parts by weight.

By intrinsic viscosity we mean the value obtained for $$\frac{t-t_o}{t_oC}$$

extrapolated to zero concentration, where $t$ is the flow time of a solution of the polymer at a concentration of C g. per decilitre of solvent through a viscometer, and $t_o$ is the flow time of the same volume of pure solvent through the same viscometer under the same conditions.

In the following examples the viscosities of the polymers were measured at 25° C. in solution in cyclohexanone.

EXAMPLE 1

A flanged-neck polymerisation vessel fitted with a stirrer, a condenser, a pressurised container for liquid vinyl chloride, a thermometer, a nitrogen inlet and outlet and an injection port for introduction of polymerisation medium and catalyst solutions was charged with a polymerisation medium of 216 parts of water and 200 parts of ethylene glycol and a mixture of 16 parts of water and 70 parts of a solution containing 28% by weight of a sodium salt of a sulfonic acid of Formula I in which R is a nonyl group, and $n$ is 4, said solution being sold commercially as Fenopon CO–433 (Fenopon is a Registered Trademark). The polymerisation medium was buffered to pH 3 by addition of an aqueous mixture of phosphoric acid and sodium hydroxide having a pH of 1. The polymerisation medium was stirred and a stream of nitrogen passed through the polymerisation vessel.

The polymerisation vessel was cooled to a temperature of —20° C. in a thermostat bath.

When the contents of the polymerisation vessel had reached a temperature of —20° C. the flow of nitrogen was stopped and a slight positive pressure of nitrogen was maintained in the vessel.

350 parts of liquid vinyl chloride were then run from the pressurised container into the polymerisation vessel, the said sodium salt thus being present in a concentration of 5.6% by weight of the vinyl chloride charged to the polymerisation vessel. After allowing time from the vinyl chloride to be cooled to —20° C. in the polymerisation vessel, 1.59 parts of carbon tetrachloride were added and polymerisation was initiated by addition of 0.2 part of ferrous sulfate (as a solution of 1.6 parts of ferrous sulfate in 46.5 parts of a mixture of ethylene glycol and water in the same proportions as used in the polymerisation medium) and 0.25 part of ammonium persulfate (as a solution of 2 parts of ammonium persulfate in 46.5 parts of said ethylene glycol/water mixture). After a further 10 minutes, 22 minutes and 32 minutes there were added respectively 0.2 part of ferrous sulfate and 0.25 part of ammonium persulfate, 0.12 part of ferrous sulfate and 0.15 part of ammonium persulfate and 0.08 part of ferrous sulfate and 0.1 part of ammonium persulfate in solution as used above.

After stirring for 5 hours, 0.3 part of quinol in 10 parts of the ethylene glycol/water mixture was added and the contents of the polymerisation vessel were allowed to warm to room temperature. No coagulation of the emulsion was visible to the naked eye. The emulsion was then filtered through a paint filtration cloth and weighed.

The solids content of the emulsion was determined by adding a saturated solution of potassium aluminum sulfate in water to a weighed sample of the emulsion. The precipitated polymer was filtered, washed with water and methanol and dried to constant weight in a vacuum oven at 50 to 60° C. 770 parts of the emulsion recovered from the filtration stage contained 32% solids by weight. The yield of vinyl chloride polymer was 70% of the vinyl chloride charged to the polymerisation vessel. The polymer in the emulsion was still stable after 4 days standing and showed no sign of coagulation into discrete particles visible to the naked eye.

The emulsion was suitable for conversion to fibers by the emulsion spinning process described previously. Prior to conversion of the emulsion into fibers it may be of advantage to add to a sample of the emulsion a sample of the fiber-forming polymeric matrix to be used in the spinning process to determine if undesirable coagulation of the emulsion results. If coagulation of the emulsion takes place on addition of the matrix the concentration of the antifreeze in the remaining emulsion should be reduced as hereinbefore described.

EXAMPLE 2

The procedure of Example 1 was repeated except that 400 parts of vinyl chloride were charged to the polymerisation vessel and polymerisation was initiated by addition of 0.2 part of ferrous sulfate and 0.25 part of ammonium persulfate (each in separate solutions thereof in the ethylene glycol/water mixture used in Example 1) the sodium salt of the sulfonic acid of Formula I as used in Example 1 being present in a concentration of 4.9% by weight of the vinyl chloride charged to the polymerisation vessel. Further quantities of 0.2 part of ferrous sulfate and 0.25 part of ammonium persulfate in solution as used above were added after 52 minutes, 60 minutes, 77 minutes and 97 minutes. After 4 hours and 40 minutes the emulsion was allowed to warm to room temperature. The emulsion showed no coagulation visible to the naked eye.

810 parts of emulsion were recovered from the filtration stage and was suitable for conversion to fiber. The solids content of the emulsion was 37%. The yield of vinyl chloride polymer was 75% of the vinyl chloride charged to the polymerisation vessel. The polymer in the emulsion was still stable after 5 days standing and showed no sign of coagulation visible to the naked eye.

EXAMPLE 3

The procedure of Example 1 was repeated except that 400 parts of vinyl chloride were used, the concentration of the sodium salt of the sulfonic acid of Formula I as used in Example 1 being 4.9% by weight of the vinyl chloride charged to the polymerisation vessel, and polymerisation was initiated by the addition of 1.24 parts of ascorbic acid in 23.5 parts of the ethylene glycol/water mixture used as the polymerisation medium, 0.04 part of ferrous sulfate in 11.8 parts of the ethylene glycol/water mixture and 0.25 part of ammonium persulfate (in a solution as used in Example 1). Further portions of 0.25 part of ammonium persulfate in solution as used above were added after 40, 60 and 95 minutes. After 4 hours and 10 minutes a solution of 0.38 part of hydroquinone in 5.85 parts of the ethylene glycol/water mixture was added. After 4 hours and 20 minutes the contents of the polymerisation vessel were allowed to warm up to room temperature. The emulsion showed no coagulation visible to the naked eye. The solids content of the emulsion recovered from the filtration stage, which was suitable for conversion to fibers, was 31.3%, 895 parts of the emulsion being recovered. The yield of vinyl chloride polymer was 70% of the vinyl chloride charged to the polymerisation vessel. The emulsion remained stable for 45 days after which time coagulation into discrete particles became visible to the naked eye.

By way of comparison, the procedure of Example 1 was repeated except that the emulsifying agent used was a mixture of 16 parts of water and 30 parts of a solution of a blend of alkyl benzene sulfonates and secondary alkyl sulfates, said solution being sold commercially as Teepol 514 (Teepol is a Registered Trademark). 125 parts of vinyl chloride were charged to the polymerisation vessel and the carbon tetrachloride used in Example 1 was replaced by an equivalent amount of bromotrichloromethane. Polymerisation was initiated by addition of 0.25 part of ammonium persulfate and 0.2 part of ferrous sulfate, each dissolved in 11.7 parts of a mixture of ethylene glycol and water in the same proportion as used in the polymerisation medium.

After stirring for 5 hours the contents of the polymerisation vessel were allowed to warm up to room temperature. The emulsion contained only 17.4% of solids and was therefore less suitable for conversion to fibers.

In an attempt to raise the solids content to an acceptable level the procedure of this comparative experiment was repeated except that 66 parts of Teepol 514 in 16 parts of water and 180 parts of vinyl chloride were used. Polymerisation was initiated by addition of 0.5 part of ammonium persulfate and 0.4 part of ferrous sulfate, each dissolved in 11.8 parts of the mixture of ethylene glycol and water in the same proportion as used in the polymerisation medium.

After stirring for 5 hours and 45 minutes a creamy mass containing coagulated particles was obtained which was quite unsuitable for conversion to fibers.

EXAMPLE 4

The procedure of Example 1 was repeated except that 80 parts of the solution of the sodium salt of the sulfonic acid of Formula I as used in Example 1, 450 parts of vinyl chloride, and 1.78 parts of carbon tetrachloride were used, the sodium salt of the sulfonic acid of Formula I as used in Example 1 thus being present in a concentration of 4.98% by weight of the vinyl chloride charged to the polymerisation vessel. Polymerisation was initiated by addition of 1.33 parts of ascorbic acid and 0.045 part of ferrous sulfate, respectively dissolved in 23.4 parts and 11.7 parts of the mixture of ethylene glycol and water used in the polymerisation medium, and 0.25 part of ammonium persulfate (from a solution of 2 parts of ammonium persulfate in 46.8 parts of said ethylene glycol/water mixture). Further portions of ammonium persulfate in solution as used above were added as follows, 0.25 part after 40, 65 and 85 minutes, and 0.125 part after 95 and 120 minutes.

After stirring for 4 hours and 45 minutes 0.2 part of quinol in 11.7 parts of the ethylene glycol/water mixture were added to the emulsion and 15 minutes later the polymerisation vessel was allowed to warm up to room temperature. The emulsion showed no coagulation visible to the naked eye. 890 parts of emulsion were recovered from the filtration stage having a solids content of 38%. The vinyl chloride polymer was produced in a yield of 75%. The emulsion was suitable for conversion to fibers and remained stable and uncoagulated after standing for 5 days.

By way of comparison the procedure of Example 1 was repeated except that the emulsifying agent was a mixture of 16 parts of water and 53 parts of a solution of a sodium salt of a secondary alkyl sulfate, said solution being sold commercially as Teepol 610 (Teepol is a Registered Trademark). 180 parts of vinyl chloride were used. Polymerisation was initiated by addition of 0.25 part of ammonium persulfate and 0.2 part of ferrous sulfate each dissolved in 11.7 parts of a mixture of ethylene glycol and water in the same proportion as used in the polymerisation medium.

After stirring for 4 hours and 50 minutes the polymerisation vessel was allowed to warm to room temperature. The emulsion had a solids content of only 13.3% and also showed visible signs of coagulation, being completely precipitated after standing for 2 months.

EXAMPLE 5

The procedure of Example 1 was repeated except that 400 parts of vinyl chloride were used, the carbon tetrachloride was omitted and polymerisation was initiated by addition of 0.04 part of ferrous sulfate and 1.24 parts of ascorbic acid, dissolved respectively in 11.7 and 23.4 parts of a mixture of ethylene glycol and water in the same proportion as used in the polymerisation medium, and 0.25 part of ammonium persulfate (from a solution of 2 parts of ammonium persulfate in 46.8 parts of said ethylene glycol/water mixture). Further portions of 0.25 part of ammonium persulfate in solution as used above were added after 30, 60 and 95 minutes. The concentration of the sodium salt of the sulfonic acid of Formula I as used in Example 1 was 4.9% by weight of the vinyl chloride charged to the polymerisation vessel.

After stirring for 5 hours and 30 minutes, 0.38 part of quinol in 11.7 parts of said ethylene glycol/water mixture were added and after a further 15 minutes the polymerisation vessel was allowed to warm to room temperature. The emulsion showed no coagulation visible to the naked eye. 824 parts of the emulsion recovered from the filtration stage contained 34% solids and the vinyl chloride polymer was produced in a yield of 70%. The emulsion remained stable and visibly uncoagulated after 12 days and was suitable for conversion to fibers.

By way of comparison the procedure of Example 1 was repeated except that the emulsifying agent was a mixture of 16 parts of water and 20 parts of a solution of an alkyl phenoxy poly(ethylene oxy)ethyl ester of phosphoric acid, said solution being sold commercially as Gafac RE610 (Gafac is a Registered Trademark). 125 parts of vinyl chloride were used. Polymerisation was initiated by 0.25 part of ammonium persulfate and 0.2 part of ferrous sulfate each dissolved in 11.7 parts of a mixture of ethylene glycol and water in the same proportions as used in the polymerisation medium.

After stirring for 5 hours the product was a jelly-like coagulated mass which was unsuitable for conversion to fibers.

EXAMPLE 6

The procedure of Example 1 was repeated except that the polymerization vessel was charged with 85 parts of ethylene glycol, 255 parts of water, 60 parts of methanol and 52.5 parts of the solution of the sodium salt of the sulfonic acid of Formula I as used in Example 1, dissolved in 54 parts of water, the said sodium salt being present in a concentration of 4.9% by weight of the vinyl chloride charged to the polymerisation vessel. The medium was buffered to pH 3 and the carbon tetrachloride was omitted. The vessel was then charged with 300 parts of vinyl chloride and polymerisation was initiated by addition of 0.93 part of ascorbic acid and 0.03 part of ferrous sulfate each dissolved in 20.5 parts of a mixture of ethylene glycol, water and methanol in the same proportions as used in the polymerisation medium, and 0.25 part of ammonium persulfate (from a solution of 2 parts of ammonium persulfate in 41 parts of the same ethylene glycol-water-methanol mixture). After 45 and 75 minutes further portions of 0.25 part of ammonium persulfate in solution as used above were added.

After stirring for 5 hours a solution of 0.28 part of quinol in 10.25 parts of the ethylene glycol-water-methanol mixture were added and after a further 15 minutes the polymerisation vessel was allowed to warm to room temperature. The emulsion showed no coagulation visible to the naked eye. 750 parts of the emulsion recovered from the filtration stage, which was suitable for conversion to fibers, had a solids content of 30% and the yield of vinyl chloride polymer was 75%. The emulsion remained stable and uncoagulated after standing for 12 days.

In a further experiment the above procedure was repeated except that 116 parts of ethylene glycol, 240 parts of water, 44 parts of methanol and 61.5 parts of the solution of the said sodium salt were charged to the polymerisation vessel, the said sodium salt being present in a concentration of 5.72% by weight of the vinyl chloride charged to the polymerisation vessel. Polymerization was initiated by addition of 1.09 parts of ascorbic acid and 0.035 part of ferrous sulfate dissolved respectively in 21.2 and 10.6 parts of the ethylene glycol-water-methanol mixture and 0.25 part of ammonium persulfate (from a solution of 2 parts of ammonium persulfate in 42.3 parts of said ethylene glycol-water-methanol mixture). After stirring for 45 and 65 minutes further portions of 0.25 part of ammonium persulfate in solution as used above were added followed by a further 0.125 part after 90 minutes.

After stirring for 4 hours and 45 minutes 0.3 part of quinol in 10 parts of said ethylene glycol-water-methanol mixture was added and the polymerisation vessel was warmed up to room temperature after a further 15 minutes. The emulsion showed no coagulation visible to the naked eye. 628 parts of the emulsion recovered from the filtration stage had a solids content of 33.5% and the yield of vinyl chloride polymer was 70%. The emulsion was still fluid and uncoagulated and suitable for conversion to fibers after standing for 13 days.

By way of comparison the procedure of Example 1 was repeated except that the polymerisation vessel was charged with 200 parts of ethylene glycol, 200 parts of water and 25 parts of a solution of a sodium salt of a secondary alkyl sulfate, said solution being sold commercially as Tergitol 7 (Tergitol is a Registered Trademark). Polymerisation was initiated by addition of 0.2 part of ferrous sulphate and 0.25 part of ammonium persulfate each as a solution in 23.5 parts of a mixture of equal weights of ethylene glycol and water. Further portions of 0.1 part of ferrous sulphate and 0.125 part of ammonium persulfate in solution as used above were added after 40 minutes.

After stirring for 5 hours and 35 minutes the polymerisation vessel was allowed to warm up to room temperature. The product was a solid mass containing large particles of polymer and was quite unsuitable for conversion to fibers.

EXAMPLE 7

The procedure of Example 1 was repeated except that 150 parts of ethylene glycol, 162 parts of water and a mixture of 12 parts water and 21 parts of the solution of the sodium salt of the sulfonic acid of Formula I as used in Example 1 were used, the said sodium salt being present in a concentration of 1.96% by weight of the vinyl chloride charged to the polymerisation vessel. The polymerisation vessel was charged with 300 parts of vinyl chloride and the carbon tetrachloride was omitted. Polymerisation was initiated by addition of 0.93 part of ascorbic acid and 0.03 part of ferrous sulfate each dissolved in 17.6 parts of a mixture of ethylene glycol and water in the same proportions as used in the polymerisation medium, followed by 0.25 part of ammonium persulfate from a solution in 6 parts of the same ethylene glycol/water mixture. Further portions of 0.25 part of ammonium persulfate in solution as used above were added after 40 and 60 minutes.

After stirring for 6 hours the polymerisation vessel was allowed to warm up to room temperature. 537 parts of the emulsion recovered from the filtration stage contained 26.9% by weight solids and the vinyl chloride polymer was produced in a yield of 47%. The emulsion removed from the polymerisation vessel remained stable and uncoagulated after standing for 2 days. Thereafter the emulsion began to coagulate.

A further sample of the emulsion which had been filtered through a paint filtration cloth was charged into a tube of regenerated cellulose (Visking tubing Scientific Instrument Centre Ltd.) the lower end of which was closed. The tube was filled by the emulsion, the open end sealed, and the tube and contents subjected to dialysis by immersing in a stream of distilled water for 10 hours. The tube was then removed from the water, opened and a further 1 part of emulsifying agent added to the emulsion for every 100 parts of the emulsion present.

The emulsion now contained 23% solids by weight and gas liquid chromatography indicated a substantial reduction in the concentration of ethylene glycol. The emulsion remained stable and uncoagulated and suitable for conversion to fibers even after standing for 200 days.

EXAMPLE 8

The polymerisation procedure of Example 1 was followed using 265 parts of vinyl chloride, 52.5 parts of the solution of the sodium salt of the sulfonic acid of Formula I as used in Example 1 in 12 parts of water and a polymerisation medium of 135 parts of water and 135 parts of ethylene glycol, the said sodium salt being present in a concentration of 5.53% by weight of the vinyl chloride charged to the polymerisation vessel. The carbon tetrachloride was omitted and polymerisation was initiated by addition of 0.93 part of ascorbic acid and 0.03 part of ferrous sulfate dissolved respectively in 15 parts and 7.5 parts of ethylene glycol and water in the same proportions as used in the polymerisation medium, followed by 0.25 part of ammonium persulfate in 5 parts of the same ethylene glycol/water mixture. Further portions of 0.25 parts of ammonium persulfate in solution as used above were added after 40 and 60 minutes.

After stirring for 6½ hours the polymerisation vessel was allowed to warm up to room temperature. The emulsion showed no coagulation visible to the naked eye. 492 parts of the emulsion recovered from the filtration stage contained 34.6% by weight solids. The vinyl chloride polymer was produced in a yield of 64.2%. The intrinsic viscosity of the vinyl chloride polymer was 2.4 dl./g.

EXAMPLE 9

The polymerisation procedure of Example 1 was followed using 394 parts of vinyl chloride, 70 parts of the solution of the sodium salt of the sulfonic acid of Formula I as used in Example 1 in 16 parts of water and a polymerisation medium of 200 parts of ethylene glycol and 200 parts of water, the said sodium salt being present in a concentration of 4.97% by weight of the vinyl chloride charged to the polymerisation vessel. The polymerisation medium was not buffered as in Example 1. The carbon tetrachloride was omitted and polymerisation was initiated by addition of 1.24 parts of ascorbic acid and 0.04 part of ferrous sulfate dissolved respectively in 20 and 10 parts of ethylene glycol and water in the same proportions as used in the polymerisation medium, followed by 0.25 part of ammonium persulfate in 5 parts of the same ethylene glycol/water mixture. Further portions of 0.25 part of ammonium persulfate in solution as used above were added after 40, 60 and 105 minutes.

After stirring for 5½ hours the polymerisation vessel was allowed to warm up to room temperature. The emulsion showed no coagulation visible to the naked eye. 850 parts of emulsion recovered from the filtration stage contained 33% by weight solids and the vinyl chloride polymer was produced in a yield of 71%. The intrinsic viscosity of the vinyl chloride polymer was 2.16 dl./g.

EXAMPLE 10

A series of polymerisations were carried out following the procedure of Example 1 using 295 parts of vinyl chloride, 300 parts of a polymerisation medium of water, ethylene glycol and methanol in the proportions shown in Table 1 and 18 parts of a solution containing 88% by weight of an ammonium salt of a sulfonic acid of Formula I in which R is a nonyl group and $n$ is 4 (Perlankrol PA conc., Lankro Chemicals Limited) (i.e. 5.38% by weight of the ammonium salt of the sulfonic acid of Formula I based on vinyl chloride). The proportions of water, ethylene glycol and methanol in the polymerisation medium were varied.

The carbon tetrachloride was omitted and polymerisation was initiated by addition of 0.93 part of ascorbic acid and 0.03 part of ferrous sulfate dissolved respectively in 15 parts and 7.5 parts of water, ethylene glycol and methanol in the same proportions as used in the polymerisation medium followed by 0.25 part of ammonium persulfate in 5 parts of the same water, ethylene glycol, methanol mixture. Further portions of 0.25 part of ammonium persulfate were added after 40 and 60 minutes.

The polymerisations were continued for 6 hours after which time the polymerisation vessels were allowed to warm up to room temperature.

The results are given in Table 1.

chloride polymer was produced in a yield of 81%. The intrinsic viscosity of the vinyl chloride polymer was 2.69 dl./g.

The above procedure was repeated except that 590 parts of vinyl chloride, 300 parts of water and 300 parts of ethylene glycol, and 36 parts of emulsifying agent (Perlankrol PA conc.) (i.e. 5.38% by weight of the am-

TABLE 1

| Experiment | Vinyl chloride parts | Polymerisation medium | | | | Perlankrol PA conc., parts | Percent by weight of NH⁴ salt [1] | Intrinsic viscosity of polymer, dl./gm. | Solids content, percent by wt. | Comments |
|---|---|---|---|---|---|---|---|---|---|---|
| | | Parts Water | Percent by volume | | | | | | | |
| | | | Water | Ethylene glycol | Methanol | | | | | |
| A | 295 | 300 | 55 | 45 | 0 | 18 | 5.38 | 2.65 | 40 | No visible evidence of coagulation. |
| B | 295 | 300 | 60 | 30 | 10 | 18 | 5.38 | 3.1 | 42.8 | Do. |
| C | 295 | 300 | 60 | 25 | 15 | 18 | 5.38 | 3.15 | | Emulsion coagulated. |
| D | 295 | 300 | 60 | 20 | 20 | 18 | 5.38 | 3.38 | | Do. |

[1] Based on vinyl chloride.

EXAMPLE 11

The procedure of Experiment B of Example 10 was repeated except that 590 parts of vinyl chloride, 600 parts of polymerisation medium and 36 parts of the ammonium salt of the sulfonic acid of Formula I as used in Example 10 were used.

The resultant emulsion showed no visible signs of coagulation. The vinyl chloride polymer had an intrinsic viscosity of 3,6 dl. gm.⁻¹.

EXAMPLE 12

A series of polymerisations were carried out following the procedure of Example 1 and using the amounts of vinyl chloride, a polymerisation medium of water, ethylene glycol and methanol, and a solution containing an ammonium salt of a sulfonic acid of Formula I as used in Example 10 indicated in Table 2. In each experiment the carbon tetrachloride was omitted and polymerisation was initiated following the procedure described in Example 10.

The polymerisations were continued for 6 hours after which time the polymerisation vessels were allowed to warm up to room temperature. The results are given in Table 2 (where indicated in Table 2 the emulsion was subjected to dialysis following the procedure described in Example 7).

monium salt of the sulfonic acid of Formula I as used in Example 10 based on the weight of vinyl chloride) in 24 parts of water were used.

The resultant emulsion showed no coagulation visible to the naked eye. 1060 parts of the emulsion recovered from filtration contained 39.2% by weight solids and the vinyl chloride polymer was produced in a yield of 70.4%. The intrinsic viscosity of the vinyl chloride polymer was 3.6 dl./g.

EXAMPLE 14

The procedure of Example 13 was followed except that the polymerisation medium comprised 300 parts of water, ethylene glycol and methanol, in the proportion of 65:15:20 parts by volume and 13.5 parts of the solution of the ammonium salt of the sulfonic acid of Formula I as used in Example 10 in 12 parts of water were used, the said ammonium salt being present in a concentration of 4.03% by weight of the vinyl chloride.

The resultant emulsion which showed no coagulation visible to the naked eye contained 42% by weight solids after removal from the filtration stage and the intrinsic viscosity of the vinyl chloride polymer was 2.6 dl./g.

EXAMPLE 15

The procedure of Example 14 was followed except that 9 parts of the solution of the ammonium salt of the sul-

TABLE 2

| Experiment | Vinyl chloride parts | Polymerisation medium | | | | Perlankrol PA conc., parts | Percent by weight of NH⁴ salt [1] | Intrinsic viscosity of polymer, dl./gm. | Solids content, percent by wt. | | Comments |
|---|---|---|---|---|---|---|---|---|---|---|---|
| | | Parts | Percent by volume | | | | | | Before dialysis | After dialysis | |
| | | | Water | Ethylene glycol | Methanol | | | | | | |
| A | 590 | 600 | 65 | 20 | 15 | 36 | 5.38 | 3.4 | 37.9 | | No visible evidence of coagulation. |
| B | 295 | 300 | 65 | 20 | 15 | 18 | 5.38 | 3.2 | 39.6 | | Do. |
| C | 590 | 600 | 65 | 20 | 15 | 36 | 5.38 | | | 29.6 | Do. |
| D | 590 | 600 | 65 | 15 | 20 | 36 | 5.38 | | | 29.5 | Do. |
| E | 295 | 300 | 65 | 10 | 25 | 18 | 5.38 | | | | Emulsion coagulated in discrete particles. |

[1] Based on vinyl chloride.

EXAMPLE 13

The polymerisation procedure of Example 1 was followed using 295 parts of vinyl chloride, 18 parts of a solution of an ammonium salt of a sulfonic acid of Formula I as used in Example 10 in 12 parts of water, and a polymerisation medium of 150 parts of water and 150 parts of ethylene glycol, the said ammonium salt thus being present in a concentration of 5.38% by weight of the vinyl chloride charged to the polymerisation vessel. The carbon tetrachloride was omitted and the polymerisation was initiated following the procedure of Example 8.

After the polymerisation had proceeded for 6 hours the polymerisation vessel was allowed to warm up to room temperature. The emulsion showed no coagulation visible to the naked eye.

610 parts of the emulsion recovered from the filtration stage, contained 39.3% by weight solids and the vinyl fonic acid of Formula I as used in Example 10 (i.e. 2.7% of the ammonium salt by weight of vinyl chloride) in 12 parts of water were used.

The resultant emulsion showed no coagulation visible to the naked eye and contained 42.3% by weight solids after filtration, and the intrinsic viscosity of the vinyl chloride polymer was 3.25 dl./g.

EXAMPLE 16

The polymerisation procedure of Example 1 was followed using 295 parts of vinyl chloride, a polymerisation medium of 150 parts of water and 150 parts of ethylene glycol, and 18 parts of a solution containing 38% by weight of a mixture of ammonium salts of a sulfonic acid of Formula I in which R is a nonyl group and $n$ averages 5.5 (Perlankrol FF, Lankro Chemicals Limited) (i.e. 5.88% by weight of the said ammonium salts based on the vinyl chloride).

The carbon tetrachloride was omitted and the polymerisation was initiated following the procedure described in Example 8.

After the polymerisation had proceeded for 6½ hours the polymerisation vessel was allowed to warm up to room temperature. The resultant emulsion showed no coagulation visible to the naked eye. After filtration 692 parts of emulsion were recovered containing 39% by weight solids and the vinyl chloride polymer was produced in a yield of 91.5%. The vinyl chloride polymer had an intrinsic viscosity of 2.12 dl./g.

EXAMPLE 17

The procedure of Example 16 was followed except that 28 parts of an emulsifying agent containing 65% by weight of a sodium salt of a sulfonic acid of Formula I in which R is a nonyl group and $n$ is 5 (Perlankrol FN, Lankro Chemicals Limited) (i.e. 6.18% by weight of the said sodium salt based in vinyl chloride) was used and the polymerisation was effected for 6¼ hours.

The resultant emulsion showed no coagulation visible to the naked eye. After filtration 520 parts of emulsion were recovered containing 35.3% by weight solids and the vinyl chloride polymer was produced in a yield of 62.3%. The intrinsic viscosity of the vinyl chloride polymer was 2.68 dl./g.

EXAMPLE 18

The polymerisation procedure of Example 1 was followed using 295 parts of vinyl chloride, a polymerisation medium of 150 parts of water and 150 parts of ethylene glycol and 52.5 parts of the solution of the sodium salt of the sulfonic acid of Formula I as used in Example 1 (i.e. 4.97% by weight of the said sodium salt by weight of vinyl chloride).

Polymerisation was initiated following the procedure described in Example 8 and after stirring for 5½ hours the polymerisation vessel was allowed to warm up to room temperature. The emulsion which showed no signs of coagulation visible to the naked eye, was filtered as in Example 1 and shown to contain 32.9% by weight solids and was then divided into eight approximately equal portions.

A 10 ml. sample of one of the portions was added to 90 ml. of a saturated solution of potassium aluminum sulfate in water. The vinyl chloride polymer was precipitated and the liquid phase was analysed by gas-liquid chromatography on a 6 ft. long 10% Carbowax on Embacel (60/80 mesh) column at 140° C. in a Perkin-Elmer F11 machine using butane-1,3-diol on an internal standard. The proportion of ethylene glycol in the emulsion removed from the polymerisation vessel is given in Table 3.

TABLE 3

| Time of dialysis, hr. | Percent by weight of ethylene glycol in emulsion | | Comments |
| --- | --- | --- | --- |
| | Before dialysis | After dialysis | |
| 0 | 24.1 | | After standing for 5 days the emulsion showed visible signs of coagulation. |
| 1 | | 15.7 | After standing for 100 days no sign of coagulation visible to the naked eye. |
| 2 | | 10.6 | Do. |
| 6 | | 2.4 | Do. |
| 8 | | 1.8 | Do. |
| 10 | | 1.4 | Do. |
| 300 | | 0.5 | Do. |

The remaining portions of the emulsion were sealed in separate tubes of regenerated cellulose and subjected to dialysis following the procedure described in Example 7 except that the tubes were immersed in distilled water and dialysed for periods of time indicated in Table 3, the water being replaced by fresh distilled water every ½ hour.

The tubes were then opened and 10 ml. of each of the emulsions added to 90 ml. of a saturated solution of potassium aluminum sulphate in water. The vinyl chloride polymer in each of the samples was precipitated and each of the resulting liquid phases was analysed following the above procedure. Table 3 indicates the concentration of ethylene glycol in the emulsion expressed as a percentage of the total weight of each of the emulsions after dialysis.

What we claim is:

1. In a process for the production of a stable aqueous vinyl chloride homopolymer emulsion where vinyl chloride is polymerized at a temperature below 0° C. in an aqueous medium in the presence of an emulsifying agent, the improvement wherein paid emulsifying agent comprises at least one soluble salt of a sulfonic acid derivative of an alkyl phenoxy polyether alcohol of the formula:

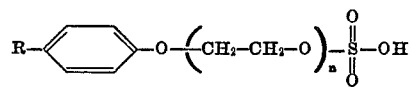

where R is an alkyl group of from 5 to 20 carbon atoms and R is a whole number of from 2 to 12.

2. A process as claimed in claim 1 in which the salt is an alkali metal salt.

3. A process as claimed in claim 2 in which the alkali metal is sodium.

4. A process as claimed in claim 1 in which the salt is an ammonium salt.

5. A process as claimed in claim 1 in which R is a nonyl group.

6. A process as claimed in claim 1 in which $n$ is a whole number in the range 2 to 9.

7. A process as claimed in claim 1 in which $n$ is 4, 5 or 9.

8. A process as claimed in claim 1 in which a mixture of soluble salts is used in which $n$ has an average value of 5.5.

9. A process as claimed in claim 1 in which the emulsifying agent is present in the aqueous medium in a concentration of 0.5% to 8% by weight of vinyl chloride.

10. A process as claimed in claim 1 in which the aqueous medium comprises a mixture of water and at least one antifreeze miscible therewith.

11. A process as claimed in claim 1 in which the antifreeze is ethylene glycol.

12. A process as claimed in claim 1 in which the antifreeze comprises a mixture of ethylene glycol and methanol.

13. A stable emulsion of a vinyl chloride homopolymer in a aqueous medium having a solids content of at least 30% by weight of vinyl chloride homopolymer and containing an emulsifying agent wherein the emulsifying agent comprises at least one soluble salt of a sulfonic acid derivative of an alkyl phenoxy polyether alcohol, said salt being soluble to the extent of at least 1% in water, said derivative of the formula:

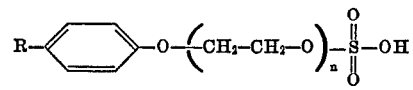

where R is an alkyl group of from 5 to 20 carbon atoms and $n$ is a whole number of from 2 to 12 said soluble salt being present in a proportion of from 0.5% to 8% by weight of vinyl chloride polymer.

References Cited

UNITED STATES PATENTS

| | | | |
|---|---|---|---|
| 2,604,467 | 7/1952 | Crouch et al. | 260—458 R |
| 2,739,136 | 3/1956 | Kharasch et al. | 260—29.6 MN |
| 3,226,349 | 12/1965 | Cull | 260—29.6 MQ |
| 3,265,722 | 8/1966 | Dudley | 260—458 |
| 3,370,028 | 2/1968 | De Wald | 260—29.6 MN |

WILLIAM H. SHORT, Primary Examiner

L. M. PHYNES, Assistant Examiner

U.S. Cl. X.R.

260—29.2 UA, 29.6 ME, 87.5, 92.8 W